Dec. 5, 1967  K. HALE ET AL  3,356,195
ELECTROSTATIC CLUTCH ARRANGEMENTS
Filed Dec. 7, 1965  2 Sheets-Sheet 1

INVENTORS
KENNETH HALE
WILLIAM HAWARDEN FISHER
HOWARD HAROLD WALTER LOSTY
BY
ATTORNEYS

Dec. 5, 1967   K. HALE ET AL   3,356,195
ELECTROSTATIC CLUTCH ARRANGEMENTS
Filed Dec. 7, 1965   2 Sheets-Sheet 2

INVENTORS
KENNETH HALE
WILLIAM HAWARDEN FISHER
HOWARD HAROLD WALTER LOSTY
BY
ATTORNEYS

United States Patent Office 3,356,195
Patented Dec. 5, 1967

3,356,195
ELECTROSTATIC CLUTCH ARRANGEMENTS
Kenneth Hale, Eccles, William Hawarden Fisher, Didsbury, and Howard Harold Walter Losty, Watford, England, assignors to The General Electric Company Limited, London, England, a British company
Filed Dec. 7, 1965, Ser. No. 512,065
Claims priority, application Great Britain, Dec. 8, 1964, 49,934/64
3 Claims. (Cl. 192—84)

ABSTRACT OF THE DISCLOSURE

An electrostatic clutch of the Johnsen-Rahbek type having two mutually engageable components which can experience relative movement when disengaged and no relative movement when engaged, the engageable surfaces of the components being in slipping contact when the components are engaged and experiencing relative motion, one of the components having an engageable surface member formed by a plurality of separate sections, each individually mounted by a ball bearing on the body of that component so as to be capable of universal pivotal movement relative to said body. The voltage required for the Johnsen-Rahbek effect is provided by a polyphase system supplied by a phase shifting circuit which converts single phase alternating current to polyphase alternating current, the phase shifting circuit being mounted within a body of that one of the components which is constituted by said plurality of sections.

---

This invention relates to arrangements of the kind comprising an electrostatic clutch depending upon the Johnsen-Rahbek effect for its operation, and electrical means for operating the clutch. The invention also relates to apparatus including particular forms of clutch and circuit arrangements associated therewith, for use in the arrangements described.

The term "clutch" as employed herein is to be understood to mean a device comprising two mutually engageable components between which there may be relative movement when disengaged but substantially no relative movement when engaged. Thus a clutch may consist of a driving component and one or more driven components to which the motion of the driving component is imparted on engagement therewith, or of a stationary component and a movable component the motion of which is stopped on engagement with the stationary component, the latter arrangement thus performing the function of a brake.

The Johnsen-Rahbek effect is the production of an electrostatic attraction, known as the Johnsen-Rahbek force, between a surface of an electrically conducting member and a closely adjacent surface of a semiconductive member, under the application of a voltage between the said members. When the said surfaces are initially in such close juxtaposition that they are in slipping contact, the Johnsen-Rahbek force produced between them when the voltage is applied is capable of causing adhesion between the surfaces, provided that the applied voltage is sufficiently high to produce a Johnsen-Rahbek force of the requisite magnitude. This effect, and its application in effecting engagement between two components of an electrostatic clutch are described by A. D. Stuckes in an article entitled "Some Theoretical and Practical Considerations of the Johnsen-Rahbek Effect," published in the Proceedings of the Institution of Electrical Engineers, volume 103 (B), 1956, pages 125 to 131.

The present invention is more particularly, although not exclusively, concerned with arrangements comprising electrostatic clutches, of the kind referred to, which are of the type comprising a rotatable driving component and one or more other components, herein referred to as the driven components, each of which is engageable wtih the driving component and when not so engaged is either stationary or moving at a different speed from, and in slipping contact with the driving surface of, the driving component.

The or each driven component of such a clutch may also be arranged to rotate on engagement with the driving component, both components being rotatable about a common axis, as for example in the case of a disc or plate clutch, in which the mutually engageable surfaces of the components are adjacent, substantially plane, surfaces of discs or plates. Alternatively, the or each driven component may be arranged to have some form of motion, other than rotation, imparted to it on engagement with the driving component, as for example in the case of a band clutch, in which the driving surface of the driving component has the form of a surface of revolution (for example a cylinder) about the axis of revolution of the said component, and the or each driven component consists of a band which extends across the said surface of the driving component with the length of the band perpendicular to the said axis, the band being held in slipping contact with the said driving surface, for example by means of springs attached to each end, and on engagement with the driving surface being pulled in a direction tangential to the driving surface against the bias of a retaining spring.

One component of a clutch of the kind referred to comprises a semiconductive member consisting of a surface layer of semiconductive material, which is in contact either with a metal body forming the main part of the component or with an electrically conducting layer interposed between the semiconductive layer and the main body of the component. The second component of the clutch may be formed entirely of metal or may have a layer of metal on an engageable surface. It is immaterial, from the point of view of the production of the Johnsen-Rahbek effect, whether the semiconductive layer is provided on the driving component or on the, or each, driven component of the clutch.

The term "engageable surface" is used herein to refer to that surface of a clutch component which is arranged, in operation of the clutch, to engage with a surface of another component of the clutch, and the term "engageable surface member" means an electrically conducting or semiconductive layer or member a surface of which provides such an engageable surface.

The electrically conducting parts of the clutch components are arranged to be connected to a source of electric current supply for the application of the required voltage between the said surface members of the components, for effecting operation of the clutch. Hitherto it has been considered necessary to operate an electrostatic clutch of the kind referred to from a direct current supply, but we have now found that such clutches can be operated satisfactorily from an alternating current supply, and that certain advantages can be derived from the latter mode of operation.

According to one aspect of the present invention, therefore, in an arrangement comprising an electrostatic clutch depending upon the Johnsen-Rahbek effect for its operation, and electrical means for operating the clutch, the said electrical means includes an alternating current supply and means connecting the mutually engageable surface members, as hereinbefore defined of the clutch components to the said supply for the application of an alternating voltage between the engageable surfaces of the clutch components, to produce a Johnsen-Rahbek force for effecting engagement between said surfaces.

It will be understood that since electrical connection is not made directly to a semiconductive surface member of a clutch component, but is made to an electrically conducting member or layer in contact therewith, any reference herein to a connection to a semiconductive member in fact means a connection to such conducting member or layer in contact with the semiconductive member.

We have found that the Johnsen-Rahbek force produced between a semiconductive surface and an electrically conducting surface, under the application of an alternating voltage between the surfaces, is always positive. Moreover the operation of an electrostatic clutch from an alternating current supply is advantageous in comparison with direct current operation, in that the Johnsen-Rahbek effect produced is independent of polarity of the connections of the supply to the respective clutch components. In contrast to this, it has previously been found that when operating an electrostatic clutch of the Johnsen-Rahbek effect kind from a direct current supply, it is desirable to ensure that the electrically conducting engageable surface member is connected to the positive pole of the supply and the semiconductive engageable surface member is connected to the negative pole, in order to maintain the Johnsen-Rahbek force between the two surfaces for an appreciable length of time: if the connections are made the other way round, the Johnsen-Rahbek effect is diminished, so that the maximum adhesion between the mutually engageable surfaces of the clutch components can only be maintained for a relatively short time.

Another advantage arising from the ability to operate an electrostatic clutch from an alternating current supply is that it is possible to employ a relatively low voltage supply, if desired or convenient, since the voltage required for operating the clutch, which may be higher, can readily be obtained therefrom by means of a transformer. It will be appreciated that the invention greatly increases the range of possible modes of operation of an electrostatic clutch of the kind referred to, since it provides for the possibility of operating such a clutch from various types of alternating current system, in addition to the previously known method of operation from a direct current supply.

In one arrangement in accordance with the invention, the engageable surface members of the clutch components are connected directly to a single phase alternating current supply (through a transformer if necessary), means being provided connecting the said surface member of one component to the line conductor of the supply and that of the other component to the neutral conductor of the supply.

In an alternative arrangement, the engageable surface member of one of the clutch components is formed in a plurality of electrically separate sections, that is to say sections electrically insulated from one another, and this surface member is connected to a single phase alternating current supply through a phase shifting circuit arrangement for effectively converting the single phase supply into a polyphase system, the arrangement then being such that the electrically separate sections of the said sectional surface member are connected through different circuit branches to the line conductor of the supply, whilst the other surface member may be connected to the neutral conductor of the supply, so that voltages of different phases are supplied to the said electrically separate sections. Advantageously the components of the phase shifting circuit are carried on or within the clutch component having the said sectional surface member, since with this arrangement the number of input terminals or conductors, for example slip-rings, which it is necessary to provide for connection of the clutch to the alternating current supply can be reduced: for example, for the operation of a rotating clutch from a balanced three-phase system produced by means of a phase shifting circuit carried by a clutch component it is only necessary to provide two slip-rings on the said component for connection to the two supply conductors, as will be shown hereinafter in a specific embodiment of the invention, instead of the three slip-rings which would be required if the three-phase system were produced externally of the clutch.

Accordingly the invention includes within its scope apparatus, for use in an arrangement of the kind described in the preceding paragraph, consisting of an electrostatic clutch one component of which has its engageable surface member formed in a plurality of sections electrically insulated from one another, a phase shifting circuit arrangement for effectively converting a single phase alternating current supply into a polyphase system, the components of which circuit arrangement are preferably mounted on or within the body of said clutch component, and means connecting the said engageable surface member sections through the different branches of the phase shifting circuit to one or more input terminals of said circuit which input terminals are adapted for connection to the line conductor of a single phase alternating current supply, when the phase shifting circuit components are carried by the clutch components, the said input terminal or terminals can also be carried on the clutch component.

The operation of an electrostatic clutch in polyphase manner confers the particular advantage that the power supplied to the clutch as a whole is maintained continuously and is substantially constant, so that appreciable fluctuations in the Johnsen-Rahbek force are avoided. In contrast to this, with single phase type operation the power, and hence the Johnsen-Rahbek force, fluctuates and is momentarily reduced to zero after every half cycle, and this fluctuation of the Johnsen-Rahbek force may produce an appreciable amount of slip between the surfaces of the clutch components when they are engaged: the slip, that is to say the relative difference in speed of movement between the two engageable components of the clutch, is normally only slight when the components are engaged, being observable by stroboscopic methods, and is expressed as the "slip angle" per revolution in the case of a clutch comprising rotating driving and driven components. In extreme cases the fluctuation of the Johnsen-Rahbek force in single phase operation might possibly result in momentary disengagement of the clutch components if the inertia of the system were insufficient to maintain engagement for the brief period of time concerned. However, the constancy of the Johnsen-Rahbek force produced with polyphase operation can for similar voltages at heavy loads result in a marked reduction of slip as compared with that occurring with the same clutch operated on single phase alternating current.

Polyphase operation of an electrostatic clutch can be achieved by conversion of a single phase alternating current supply, as indicated above, which has the advantage of enabling normal domestic alternating current supplies to be used, connected through transformers if necessary. Alternatively, however, the electrically separate sections of the sectional engageable surface member of the clutch can be connected directly to a polyphase alternating current supply system, and the invention includes an arrangement of this kind. One preferred type of polyphase system for use for the operation of an electrostatic clutch is a three-phase star-connected system, either in the form of a star-connected three-phase supply system or derived from a single phase supply by star connection of the components of a suitable phase shifting circuit arrangement. However, a clutch can be operated from other types of polyphase system, including, for example, a delta-connected three-phase supply system or delta-connected phase shifting circuit for conversion of a single phase supply. Where the components of a phase shifting circuit arrangement are carried on or within the body of a clutch component, connections of the circuit components to one another, to the engageable surface member sections of the clutch component, and to the input terminal or terminals, for the production of any desired type of polyphase system, are made by means of conductors also carried by the clutch component.

The invention includes within its scope apparatus for use in an arrangement of the kind wherein the clutch is operated from a polyphase alternating current supply system, or in an arrangement wherein a single phase supply is converted to a polyphase system by means of a phase shifting circuit the components of which are located externally of the clutch.

Thus in a clutch designed to be operated from a polyphase alternating current system produced externally of the clutch, the engageable surface member of one of the clutch components is formed in a plurality of sections electrically insulated from one another, and these sections are connected in a number of electrically separate groups, corresponding to the number of phases of the polyphase system from which the clutch is to be operated, to different input terminals on the said clutch component, which input terminals are separately connectable, by suitable means, to different phase conductors of the system. It will be understood that a "group" might comprise only one such section, but preferably at least two such surface member sections are provided for each group. Thus, four such sections are preferably provided in a clutch designed for operation from a two-phase system and six sections in a clutch designed for operation from a three-phase system. In the case of a rotatable clutch component, the two or more surface sections in each group are preferably arranged symmetrically about the axis of rotation of the said component. Connection of the input terminals on a rotatable clutch component to the phase conductors may conveniently be made by means of slip-rings carried on the clutch component and arranged to co-operate with brushes in known manner.

Preferably the semiconductive surface member of the clutch is formed in sections as aforesaid, the sections of semiconductive material being individually backed with a layer of electrically conducting material, for connection to the clutch input terminals.

It will of course be understood that the apparatus for use in an arrangement in accordance with the invention will include, in association with the mutually engageable components of the clutch, a stationary component which carries terminals to which the alternating current supply is connected, and which also carries means for conveying the current from said supply terminals to the mutually engageable clutch components, for example brushes or slip-rings where one or both of the said components is or are arranged to rotate in operation.

When one of the clutch component engageable surfaces is formed in a plurality of sections, for connection to the phase conductors of a polyphase system as described above, the engageable surface member of the other clutch component will in general be arranged to be connected to the neutral supply conductor, but with a balanced polyphase system this might not always be necessary. However, in a clutch which is to be operated from a balanced polyphase system, it will in general be necessary to ensure that the said separate surface sections to be connected to the respective phase conductors are so constructed that they all possess the same electrical impedance: this can conveniently be achieved by constructing all the said sections of the same dimensions.

In the case of an engageable surface member formed in a plurality of sections, in a clutch designed for polyphase operation, the said sections are preferably individually mounted on a surface of the main body of the clutch component in such a manner that they are capable of pivotal movement, preferably universal, relative to the said main body, such that the engageable surface of each of said sections is individually alignable with the engageable surface of the second component of the clutch when the two components are in the disengaged position, as described in the specification of co-pending patent application No. 512,064, filed Dec. 7, 1965.

The mutually engageable surface members of the respective clutch components in a clutch included in an arrangement in accordance with the invention can be formed of any suitable conducting and semiconducting materials respectively. Thus the metal-surfaced component may comprise a surface member or surface sections of any metal or alloy of sufficient hardness and strength to withstand the forces applied to it in operation of the clutch, for example stainless steel; if desired, for example in the driven component of a disc clutch, such surface member or surface sections may be supported by a backing plate of a different metal or alloy, for example a light alloy if it is desired to reduce the total weight of the clutch component. The semiconductive surface member, or surface sections, of the other clutch component may be formed of any semiconductive material known to be suitable for use in electrostatic clutches employing the Johnsen-Rahbek effect, such as some ceramic dielectric materials. The preferred material for use for the semiconductive surface member in a clutch arrangement in accordance with the invention is, however, semiconductive carbon composed of partially carbonised regenerated cellulosic or hemicellulosic material, which carbon is advantageous for use in electrostatic clutches since it possesses self-lubricating properties, and also possesses electrical resistivity in a range of suitable values, is hard and machinable and can be polished to give a satisfactory surface finish, and has suitable frictional characteristics and thermal conductivity, the electrical, frictional and thermal properties being adustable as desired by control of the process of manufacture of the carbon. Preferably, in a clutch designed for operation from a polyphase system in accordance with the invention, the electrically separate sections of the sectional engageable surface member are formed of such semiconductive carbon.

An electrostatic clutch arrangement in accordance with the invention may incorporate either a clutch of the type comprising a driving component and a single driven component, such as a disc or plate clutch wherein both said components are rotatable about a common axis, or a clutch of the type comprising a driving component and a plurality of driven components, such as a band clutch having a plurality of bands which are engageable with a rotatable driving component. Accordingly the above references to the clutch components as "one component" and "the other component" are to be understood to include cases where one of said components is in fact constituted by a plurality of driven components which are engageable, simultaneously or separately, with a single driving component, the engageable surface member either of the driving component or of each of said driven components then being arranged to be connected either to the same supply conductor, or to different supply conductors for polyphase operation, as appropriate, for effecting engagement between the driving and driven components. In addition, an arrangement in accordance with the invention may include a clutch of the type comprisig a stationary component and a movable component the motion of which is braked on engagement with the stationary component.

Some specific embodiments of apparatus for use in arrangements in accordance with the invention will now be described by way of example, with reference to the accompanying drawings, in which.

Figure 1:
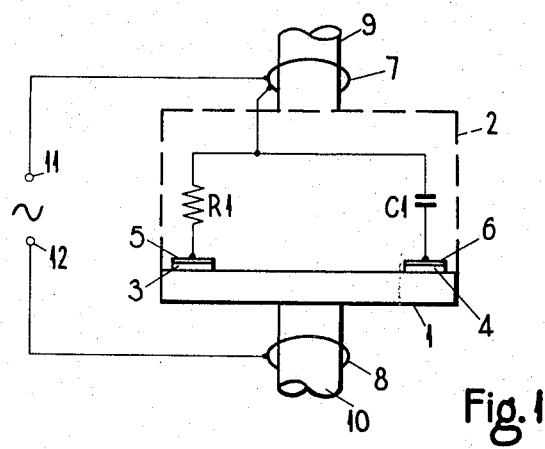
FIGURE 1 is a diagrammatic representation of apparatus including a disc clutch and means for operating the clutch from a single phase alternating current supply, converted into a two-phase system.

Referring to FIGURE 1 of the drawings, the driven component of the clutch comprises essentially a stainless steel disc 1; the main body of the driving component is shown in outline by the broken line 2, and the engageable surface of this component is formed by discs of semiconductive carbon, two of which are shown, 3, 4, these discs being provided with backing layers of metal, as shown at 5, 6.

Slip-rings 7 and 8, are mounted on the shafts 9 and 10, of the driving component and the driven component respectively, and these slip-rings are respectively connected to the line terminal 11, and the neutral terminal 12, of a single phase alternating current supply. The slip-ring 8 is connected directly to the steel plate 1, forming the engageable surface member of the driven component of the clutch. The slip-ring 7 is connected to the metal layers 5 and 6, in contact with the semiconductive carbon discs 3 and 4, of the driving component, through a circuit arrangement which is mounted within the body of the driving component and which comprises a resistance R1 and a capacitor C1 in parallel: the values of R1 and C1 are preferably so adjusted that in operation the circuit arrangement produces a phase shift of at least 60° in the current supplied to the conducting layer 6, so that the clutch is effectively operated on a two-phase system. Since a two-phase system is unbalanced, it is necessary to provide connections from the supply to both of the clutch components, as shown and described.

Although only two semiconductive carbon discs are shown in the drawing, for simplicity, preferably the engageable surface of the driving component of the clutch consists of four such discs, two being connected in parallel to each phase conductor from the circuit arrangement R1, C1.

In one particular example of an arrangement of the form shown in FIGURE 1, designed to be operated from a single phase supply of frequency 50 cycles per second, suitable values for the circuit components to give a phase shift of 60°, are as follows:

Resistance of each carbon disc 3, 4=40,000 ohms
Resistance R1=40,000 ohms

Capacitance of capacitor $C1 = \frac{1}{\sqrt{3}\cdot\pi}$ microfarads

Figure 2:
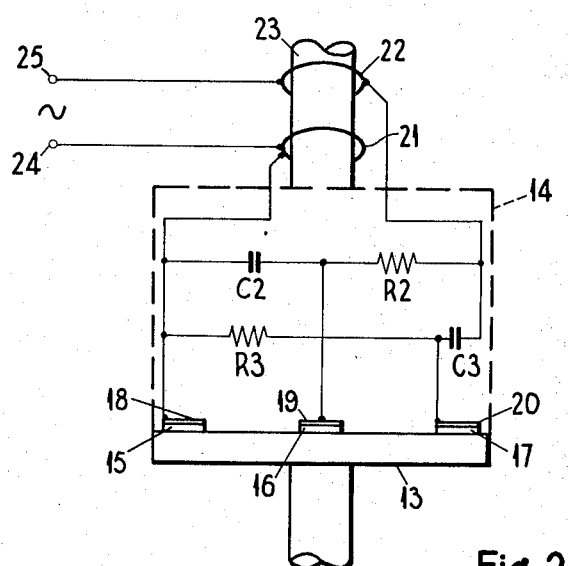
FIGURE 2 shows, also diagrammatically, another form of apparatus for the operation of a disc clutch, including means for converting a single phase alternating current supply into a three-phase system.

In the arrangement shown in FIGURE 2, the engageable surface member of the driven component of the clutch is again a stainless steel plate 13, and the driving component, the outline of the main body of which is indicated by the broken line 14, has a sectional engageable surface consisting of three pairs of semiconductive carbon discs: one member of each pair of carbon discs is shown in the drawing, at 15, 16 and 17, these discs being backed by electrically conducting layers 18, 19, and 20.

Two slip-rings 21 and 22, are mounted on the shaft 23, of the driving component of the clutch, and are connected to the terminals 24, 25, of a single phase alternating current supply. The slip-ring 21 is connected directly to the conducting layer 18; the same slip-ring is connected to the conducting layer 19 through a capacitor C2, this circuit being completed through a resistance R2 and a connection to the conducting layer 20 through a resistance R3, and this circuit is completed through a capacitor C3 and a connection to the slip-ring 22. This circuit arrangement, which is mounted within the body of the driving component as shown, produces a phase shift, relative to the supply voltage, of approximately 60° in the current supplied to the conducting layer 19, and a phase shift of approximately 60° in the opposite direction in the current supplied to the conducting layer 20, resulting effectively in three-phase operation of the clutch. The backing conductors of the second members of the pairs of carbon discs, not shown in the drawing, are connected to the circuit arrangement shown, in parallel respectively with the conducting layers 18, 19 and 20. No connection from the steel plate of the driven component of the clutch to the supply is necessary with the circuit arrangement shown in FIGURE 2, since this arrangement produces a balanced system.

In order to ensure that a balanced three-phase system is derived from the circuit arrangement shown in FIGURE 2, the values of the resistances and capacitances of the circuit components should be so chosen as to satisfy the following equations:

$$C_3\omega R_2 = \frac{2}{\sqrt{3}} \quad (1)$$

$$C_2\omega R_2 = \frac{1}{\sqrt{3}} + \frac{1}{\sqrt{3}}\cdot\frac{R_2}{R_c} \quad (2)$$

$$C_3\omega R_2 = \sqrt{3} + \frac{2}{\sqrt{3}}\cdot\frac{R_3}{R_c} \quad (3)$$

Where $C_2$ and $C_3$ are the capacitances in farads of the capacitors C2 and C3 (FIGURE 2) respectively; $R_2$ and $R_3$ are the resistances in ohms of the resistors R2 and R3 (FIGURE 2) respectively; $R_c$ is the resistance in ohms of each of the carbon discs 15, 16, 17 (FIGURE 2); and $\omega = 2\pi \times$ the frequency of the single phase supply.

If $R_c$ is large compared with the resistances $R_2$ and $R_3$, then the above equations may be replaced by the following approximate equations:

$$C_2 R_2 \omega = \frac{1}{\sqrt{3}} \quad (4)$$

$$C_3 R_3 \omega = \sqrt{3} \quad (5)$$

Figure 3:
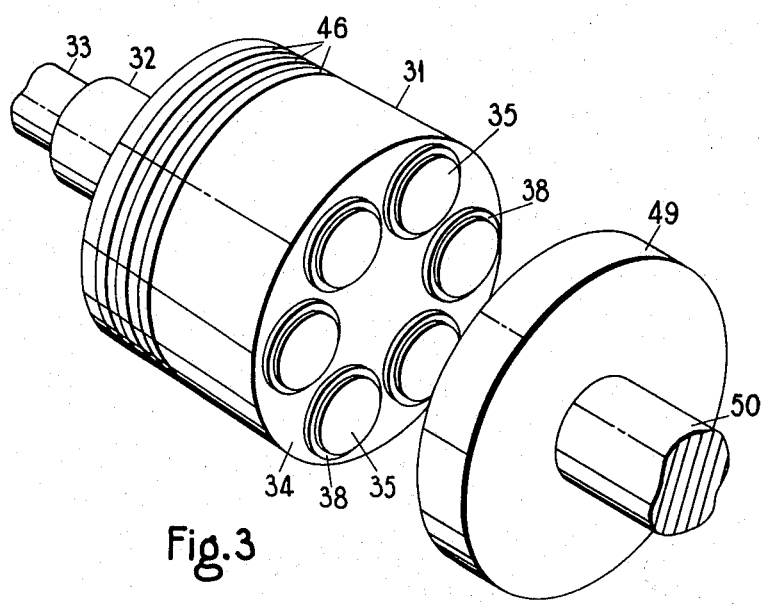
FIGURES 3 and 4 show one particular form of clutch which is suitable for operation from a three-phase alternating current system.
Figure 4:
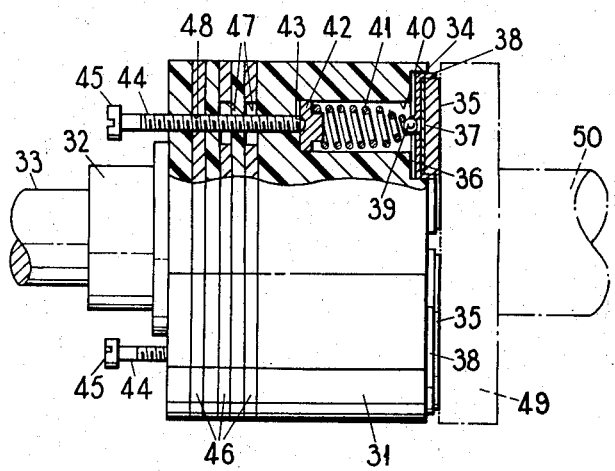

In a particular example of an arrangement of the form shown in FIGURE 2, designed to be operated from a single phase supply of frequency 50 cycles per second, suitable values for the circuit components are as follows:

$R_c$=40,000 ohms
$R_2$=20,000 ohms
$R_3$=60,000 ohms $C_2 = \frac{\sqrt{3}}{4\pi}$ microfarads $C_3 = \frac{1}{\sqrt{3}\cdot\pi}$ microfarads Referring now to FIGURES 3 and 4 of the drawings, the driving component of the clutch shown comprises a cylindrical main body, 31, of high strength insulating material, for example a high strength synthetic resin, carried on a mild steel hub, 32, the extension of which, 33, is arranged to mate on to the output shaft of the power source employed to drive the clutch (the said power source is not shown in the drawing). On the end face 34, of the insulating body 31, are mounted six discs of semiconductive carbon 35, all of the same dimensions and equally spaced around the periphery of the face 34, being located in recesses 36. Each carbon disc is backed with a coating of silver 37, and is mounted in an aluminium cup 38, the silver-coated surface of the carbon disc being fixed to the interior surface of the aluminium cup by means of an adhesive resin containing a dispersion of silver flake. A steel ball 39, is fixed to the centre of the outer surface of each of the aluminium cups: this ball serves to locate the aluminium cup and carbon disc centrally with respect to the open end of a chamber 40, in the insulating body 31, communicating with said recess 36. The steel ball also serves as a bearing on which the cup and disc can pivot so as to be capable of universal movement with respect to the end face 34. Each chamber 40, houses a helical compression spring 41, upon one end of which the steel ball 39, bears when the aluminium cup is in position in the recess 36. A small brass cup 42, is spigoted into the end of each spring 41, which is remote from the carbon disc assembly, and the recess 43, in said cup serves to locate a screw 44, which is fixed by means of a screw head 45.

One or more brass discs 46 (three are shown in the drawing), are located in that end of the driving component which contains the screws 44, said discs extending to the exterior of the insulating body 31, so that their peripheries form slip-rings on the exterior of the component; the discs are insulated from one another by portions of the insulating body 31. Each of the discs 46, is provided with six equal spaced holes, located in such positions that each of the six screws 44, will pass through a hole in each disc: the holes in each disc consist of four clearance holes 47, through which four of the screws 44 pass without coming into contact with the disc, and two smaller, screw-threaded holes 48, with which two of the screws 44 co-operate, the two screw-threaded holes in each disc being located diametrically opposite to one another with respect to the circumference of the disc. Electrically conducting connection of the conducting backing layer 37, of each carbon disc 35, to a slip-ring (that is to say to the periphery of one of the brass discs 46), is thus provided through the conducting adhesive and the aluminium cup 38, the steel ball 39, spring 41, brass cup 42, and screw 44 co-operating with the appropriate brass disc 46. For three-phase operation of the clutch, two diametrically opposed carbon discs are connected in this way to each slip-ring, and each slip-ring is arranged to be connected to one phase line conductor by means of a brush, in known manner.

One preferred method of preparing the carbon discs 35, employed in the driving component described above, comprises beating hemicellulosic pulp in water, the concentration of the pulp being 2% by weight, for four hours in a standard type of beater of the kind used in the paper-making industry, regenerating the hemicellulosic material by centrifuging the aqueous dispersion to remove the free water therefrom, pressing the centrifuged pulp in the form of discs, drying the discs and finally heating them to 500° C. in nitrogen under a pressure of about 300 atmospheres. The surfaces of the discs which are arranged to engage with the surface of the driven component in operation of the clutch are subjected to a suitable polishing treatment for imparting the required degree of smoothness to the surfaces.

The driven component of the clutch, shown in FIGURE 1 of the drawings, comprises a plate 49, of steel composed of 2.7–3.5% carbon, 0.5% manganese, 1.35% silicon, 0.05% lead, 2.3–2.5% nickel, 0.4–0.7% molybdenum, 0.5–0.8% chromium, and the balance iron, this plate being mounted on a shaft 50. In a modification, not shown in the drawing, the steel plate may be thinner and may be mounted on a light alloy hub which is in turn mounted on the shaft.

The construction of the driving component of the clutch of the form shown in FIGURES 3 and 4 has been described above with particular reference to the method of operating the clutch from a three-phase star-connected alternating current supply: thus for this mode of operation, one diametrically opposed pair of carbon discs is connected to each of three slip-rings 46, and each slip-ring is connected to one of the phase line conductors. However, a clutch of this form can, alternatively, be operated, in accordance with the invention, from a single phase alternating current supply: in this case the six carbon discs 35, are all arranged to be connected to a single supply conductor by means of a common conductor, for example by arranging that all of the six screws 44 co-operate with a single brass disc 46.

In all of the above modes of operation, the steel plate 49 of the driven component of the clutch is arranged to be connected to a single supply conductor, this being the neutral conductor in the case of single phase or polyphase alternating current operation. Alternatively, when the supply is a balanced polyphase system, for example a star-connected system, the plate 49 may be earthed. The steel plate 49 may itself be directly connected to the supply, or if desired the driven component may be provided with a slip-ring for connection to the supply.

The results of tests which we have carried out on a clutch of the form described with reference to FIGURES 3 and 4 of the drawings, when operated from single phase and star-connected three-phase alternating current supplies respectively, are shown in the following table. In the particular clutch used for the tests, the six carbon discs were each 24 mm. in diameter and 0.5 mm. in thickness, and the exposed carbon surfaces of the individual discs were lapped with 600 grade carborundum prior to assembly of the driving component of the clutch, final polishing of the said surfaces of the discs being achieved by allowing the clutch to operate under controlled slip conditions.

Referring to the various terms used in the column headings of the table, the "running torque" is the torque transmitted when the clutch components are engaged, and is measured by dynamometer at the threshold of slip after the gradual application of the load; the "on load starting torque" is the load at which the clutch will repeatedly engage when there is 100% slip between the components; the "frictional drag" is the torque produced by frictional effects between the mutually engageable surfaces of the clutch when the clutch is electrically de-energised; the "drive to drag ratio" is the ratio of the running torque transmitted to the frictional drag, the average figure for the frictional drag being used in this case; the "slip angle" is a measure of the amount of slip per revolution (as hereinbefore defined) between the clutch components when engaged, as observed by stroboscopic methods; and the "control ratio" is the ratio of the power (in watts) transmitted through the clutch to the power input.

TABLE

| Supply voltage | Torque, lbs.-inch, at 700 r.p.m. | | | Drive to drag ratio | Slip angle, degrees per revolution | Current used and power input | Power transmitted, brake horsepower | Control ratio |
| --- | --- | --- | --- | --- | --- | --- | --- | --- |
| | Running torque | On load starting torque | Frictional drag | | | | | |
| 415 three-phase A.C. | 26.0 | 13.8 | 1.5–2.5 | [1] 13:1 | 0.12 | 8 milliamps, 5.5 watts | 0.27 | 42:1 |
| 240 single phase A.C. | 22.0 | 11.6 | 1.5–2.5 | [1] 11:1 | 0.8 | 21 milliamps, 5 watts | 0.23 | 36:1 |

[1] Average.

We claim:
1. An electrostatic clutch for operation from a single phase alternating current supply
 (A) which clutch is of the kind
  (I) operated by means of an electrostatic attraction produced between a surface of an electrically conducting member and a closely adjacent surface of a semiconductive member when a voltage is applied between the said members,
   (a) which voltage is sufficiently high to produce a said electrostatic attraction of such magnitude as to cause adhesion between the said surfaces, and
  (II) comprising two components each of which comprises a main body having a surface mem- ber directly engageable with a surface member of the other component, the said surface members being composed respectively of an electrically conducting material and a semiconductive material,
(a) which components are capable of relative motion when the said mutually engageable surface members are disengaged, in the absence of a said applied voltage, the said surface members being in slipping contact with one another when disengaged, and
(b) between which components there is substantially no relative motion when the said mutually engageable surface members are engaged as a result of the application of a said voltage;
(B) wherein the said engageable surface member of one of said components of the clutch consists of a plurality of separate sections electrically insulated from one another, and
(C) wherein the said clutch component having an engageable surface member consisting of said separate sections has mounted within its main body
(I) the components of a phase shifting circuit arrangement for effectively converting a single phase alternating current supply having line and neutral conductors into a polyphase system, and
(II) means connecting the said engageable surface member sections through different branches of the phase shifting circuit arrangement to at least one input terminal of said circuit arrangement,
(a) which input terminal is adapted for connection to the line conductor of the single phase alternating current supply.

2. Apparatus according to claim 1 wherein the said engageable surface member sections constitute the semiconductive surface member of the clutch, and each section of semiconductive material is individually backed with a layer of electrically conducting material for connection to a said branch of the phase shifting circuit.

3. Apparatus for use in an arrangement according to claim 1 wherein the semiconductive surface member of the clutch is formed of semiconductive carbon composed of a partially carbonised regenerated material which is a member of the group consisting of cellulosic and hemicellulosic materials.

References Cited

UNITED STATES PATENTS

| | | | |
|---|---|---|---|
| 2,788,104 | 4/1957 | Mason | 192—84 |
| 2,850,907 | 9/1958 | Foster | 192—84 |
| 3,223,864 | 12/1965 | Munson | 310—105 |

DONLEY J. STOCKING, Primary Examiner.

ARTHUR T. McKEON, Examiner.